United States Patent
Linser (10) Patent No.: US 9,644,742 B2
(45) Date of Patent: May 9, 2017

(54) TWO-STAGE SEAL FOR A VALVE (71) Applicant: FISHER CONTROLS INTERNATIONAL LLC, Marshalltown, IA (US)

(72) Inventor: Mark J. Linser, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 396 days.

(21) Appl. No.: 14/185,821

(22) Filed: Feb. 20, 2014

(65) Prior Publication Data

US 2014/0264137 A1    Sep. 18, 2014

Related U.S. Application Data

(60) Provisional application No. 61/800,093, filed on Mar. 15, 2013.

(51) Int. Cl.
*F16J 15/32* (2016.01)
*F16J 15/16* (2006.01)
(Continued)

(52) U.S. Cl.
CPC ......... *F16J 15/164* (2013.01); *F16J 15/3208* (2013.01); *F16J 15/3236* (2013.01);
(Continued)

(58) Field of Classification Search
CPC .. F16J 15/008; F16J 15/56; F16J 15/46; F16J 15/002; F16J 15/164; F16J 15/3276;
(Continued)

(56) References Cited

U.S. PATENT DOCUMENTS 3,563,557 A * 2/1971 Doutt .................. F16J 15/3236
                                                  277/438
4,658,847 A * 4/1987 McCrone ............... E06B 5/164
                                                  137/72
(Continued)

FOREIGN PATENT DOCUMENTS

WO   WO-2004083691 A1   9/2004
WO   WO-2012080253 A1   6/2012

OTHER PUBLICATIONS

International Search Report and Written Opinion for International Application No. PCT/US2014/022964, mailed Jul. 18, 2014, 10 pages.
(Continued)

*Primary Examiner* — Craig Schneider
*Assistant Examiner* — Andrew J Rost
(74) *Attorney, Agent, or Firm* — Marshall, Gerstein & Borun LLP (57) ABSTRACT

A two-stage seal, such as a ring seal for use in a pressurized process fluid line, has a dynamic sealing member and a static sealing member. The dynamic sealing member is arranged to continuously sealingly engage against a seal surface that slides along the dynamic sealing member. The static sealing member is arranged to sealingly engage against the seal surface in response to an increased process fluid pressure within the process fluid line to increase static seal pressure against the seal surface. The static sealing member is also arranged to release from the seal surface to minimize friction with the seal surface when the process fluid pressure drops and/or in response to movement of the seal surface. The two-stage seal may be used in arrangements requiring both dynamic sealing and static sealing, such as in some process control valves. A process control valve having the two-stage seal is disclosed.

20 Claims, 5 Drawing Sheets

(51) Int. Cl.
*F16J 15/3208* (2016.01)
*F16J 15/3236* (2016.01)
*F16K 3/24* (2006.01)
*F16J 15/3276* (2016.01)
*F16K 3/26* (2006.01)
*F16K 25/02* (2006.01)

(52) U.S. Cl.
CPC ........... *F16J 15/3276* (2013.01); *F16K 3/243* (2013.01); *F16K 3/267* (2013.01); *F16K 25/02* (2013.01)

(58) Field of Classification Search
CPC .. F16J 15/3208; F16J 15/3236; F16J 15/3212; F16K 3/243; F16K 255/00
USPC ........ 251/214; 277/558, 647, 648, 649, 438, 277/439, 447, 353, 549, 554, 566, 568, 277/402
See application file for complete search history.

(56) References Cited

U.S. PATENT DOCUMENTS

| | | | |
|---|---|---|---|
| 4,917,390 A * | 4/1990 | Lee ................. | F16J 15/3208 277/468 |
| 5,050,892 A * | 9/1991 | Kawai ................ | F16J 15/56 277/436 |
| 6,027,123 A * | 2/2000 | Berry, Sr. ............ | B65D 88/60 277/434 |
| 2004/0239052 A1 | 12/2004 | Baumann | |
| 2011/0285095 A1* | 11/2011 | Okuma ............... | F15B 15/1452 277/628 |

OTHER PUBLICATIONS

Examination Report, European patent application No. 14721587.5, mailing date Jun. 21, 2016.

* cited by examiner

TWO-STAGE SEAL FOR A VALVE

FIELD OF THE INVENTION

The present invention relates generally to a two-stage seal, such as a seal that is usable in a process control valve.

BACKGROUND

In pressurized process flow lines, it is often necessary to place a seal between a first surface and a second surface that slides along the first surface between two or more different static positions. In these circumstances, the seal often needs to meet multiple functional criteria. The seal needs to provide a strong static seal against one or both of the first and second surfaces, especially at the two or more different static positions, in order to prevent process fluid from seeping between the two surfaces. The seal also needs to maintain a dynamic seal against one or both of the surfaces to prevent process fluid from seeping between the two surfaces while the seal is sliding along the opposing seal surface. However, it is generally undesirable for the dynamic seal to impinge so strongly against the two surfaces so as to unduly impede movement of the first and second surfaces by excess friction.

Figure 1:
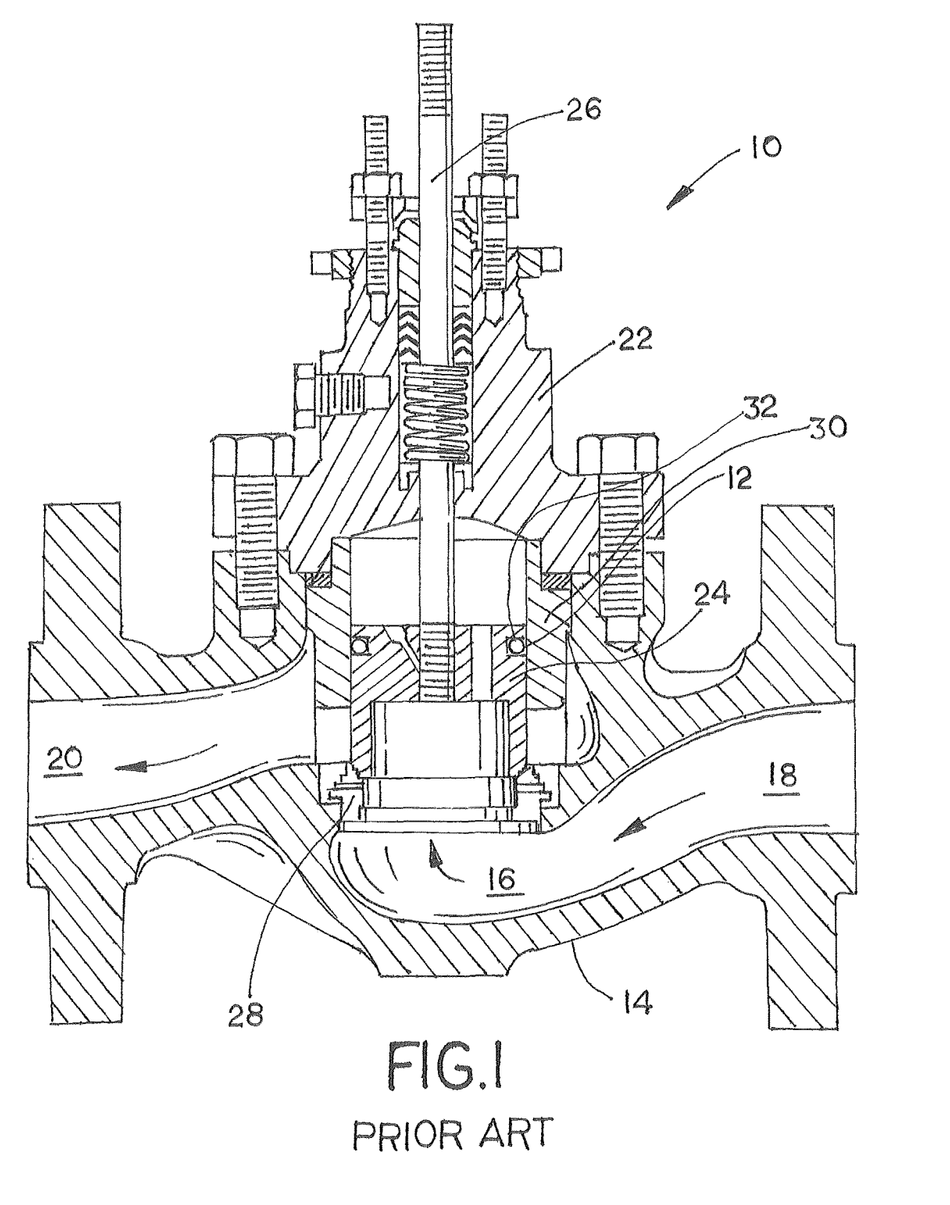
FIG. 1 is a cross-sectional view of a sliding stem valve for a pressurized process control line with a ring seal according to the prior art.

FIG. 1 shows an example sliding stem valve 10 of a pressurized process flow line including a seal 12 that forms both a dynamic seal and a static seal. The sliding stem valve 10 includes a valve body 14 defining a flow passage 16 extending from an inlet 18 to an outlet 20, a bonnet 22 attached to the valve body 14, a flow control member 24 in the flow passage 16 and arranged to open and/or close the flow passage 16, and a valve stem 26 attached to the flow control member 24 and extending out through the bonnet 22 for operative coupling with a valve actuator (not shown). The flow control member 24 closes the flow passage 16 by sealingly engaging against a valve seat 28 surrounding the flow passage 16 in a closed position. The flow control member 24 opens the flow passage 16 by moving away from the valve seat 28 into an open position. The valve stem 26 slides up and down, i.e., reciprocates linearly, to move the flow control member 24 into and out of sealing engagement with the valve seat 28. A cage 30 in the form of a tubular, e.g., cylindrical, member surrounds the flow control member 24 to keep the flow control member 24 in alignment with the seat 28. The flow control member 24 is sized to fit inside the cage 30 such that the outer peripheral surface (e.g., an outside diameter) of the flow control member 24 is only slightly smaller than the inner peripheral surface (e.g., an inside diameter) of the cage 30, for example forming a gap therebetween, for example, of less than a few hundredths of an inch or of less than a few tenths of a millimeter.

The seal 12 is arranged to maintain a fluid seal in the gap between the flow control member 24 and the cage 30. In the past, it was customary for the seal 12 to be a ring seal, such as an o-ring, formed of resilient sealing material, such as rubber or a similar material, and with a circular or rectangular cross-section profile. The o-ring seal 12 is disposed in a land 32 that forms a groove in the outer peripheral surface of the flow control member 24. The seal 12 sealingly engages against both the outer peripheral surface of the flow control member 24 within the land 32 and the inner peripheral surface of the cage 30.

However, the o-ring seal 12 only provides a single sealing mechanism, i.e., the outermost and innermost diametrical surfaces of the o-ring, to provide both a static seal and a dynamic seal. Thus, an o-ring type seal 12 is limited in its ability to provide a strong static seal between the flow control member 24 and the cage 30 without also causing excessive frictional forces while forming a dynamic seal that could impair or impede the motion of the flow control member 24 between the open and closed positions inside the cage 32.

SUMMARY

According to some aspects, a two-stage seal, such as a ring seal for use in a pressurized process fluid line, for example, a process control valve, has a dynamic sealing member and a static sealing member, which, preferably, can form a dynamic seal and a static seal, respectively, at least partly independently of each other.

In one exemplary arrangement, a two-stage seal for forming a static lateral seal and a dynamic lateral seal along a sliding interface between a first sealing surface and a second sealing surface in a pressurized process line is disclosed. The seal includes a body defining a dynamic seal member and a static seal member. Each of the dynamic seal member and the static seal member is arranged to sealingly engage the first sealing surface. The first surface is arranged to shift in relation to the body. A spring member is carried by the body. The dynamic seal member is arranged to form a dynamic seal with the first sealing surface. The static seal is arranged to form a static seal with the first sealing surface in response to an increased pressure in the pressurized process line and is arranged to release the static sea. The dynamic seal member functions substantially independently of the static seal member.

According to another exemplary arrangement, a two-stage seal has a profile extending along a longitudinal axis. The profile includes a body and a lateral spring member. The body defines a base member extending laterally from a first end to a second end, a first seal wall extending upwardly from the first end of the base member, a second seal wall extending upwardly from the second end of the base member, and a first wiper seal extending laterally outwardly from the first end of the base member. The base member and the first and second seal walls define a groove opposite the first wiper seal a lateral spring member carried by the base member. The lateral spring member has a second profile extending from the first end to the second end of the base member. The base member and the lateral spring member urge the wiper seal laterally outwardly toward a static sealing position in response to an increased pressure inside the groove. The lateral spring member urges the wiper seal laterally inwardly from the static sealing position.

According to a further exemplary aspect, a valve assembly for a pressurized process flow line is disclosed. The valve includes a valve body defining a flow passage extending from an inlet to an outlet, a flow control member disposed in the flow passage and arranged to shift in relation to a fixed surface along the flow passage to open and close the flow passage, and a two-stage seal. The two-stage seal has a seal body and a spring member. The seal body is arranged to form a dynamic seal and a static seal across an interface between the flow control member and the fixed surface. The seal body is arranged to engage the static seal in response to a pressure spike in the flow passage. The spring member is arranged to disengage the static seal. The seal is preferably in the form of a ring seal, such as a circular seal, an oval seal, or a polygonal seal.

In accordance with the teachings of the present disclosure, any one or more of the foregoing aspects and/or exemplary aspects of a two-stage seal and/or a valve assembly may further include any one or more of the following optional forms.

In some optional forms, the body of the seal has a profile including a base member, a first seal wall extending from the base member in a first direction and defining the dynamic seal member, a groove adjacent the base member and adjacent the first seal wall, and/or a wiper seal extending laterally from the base member in a second direction and defining the static seal member. Preferably, increased fluid pressure in the groove causes the wiper seal to shift laterally in the second direction. The profile extends along a longitudinal axis, which preferably is curved in the form of a ring.

In some optional forms, the body defines a base member extending laterally from a first end to a second end, a first seal wall extending upwardly from the first end of the base member, a second seal wall extending upwardly from the second end of the base member, a first wiper seal extending laterally outwardly from the first end of the base member, wherein the base member and the first and second seal walls define a groove opposite the first wiper seal;

In some optional forms, the base member bows away outwardly from the groove. The base may shift the wiper seal laterally in the second direction in response to the increased pressure.

In some optional forms, the spring member is carried by the base member. The spring member may be arranged to urge the wiper seal laterally in a third direction opposite the second direction. The spring member may form an arch laterally across the base member. The arch may be convex toward the groove. The spring member may be encased within the base member. The lateral spring member may have an arched profile with a convex side directed upwardly toward the groove. The spring member may include a hinge portion along the profile.

In some optional forms, the wiper seal is offset downwardly from the base member.

In some optional forms, the body of the two-stage seal includes a first support rail projecting downwardly from the base member and a second support rail projecting downwardly from the base member. The base member and the first and second support rails define a cavity. A bottom wall may enclose the cavity. The bottom wall may extend from the first support rail to the second support rail. The bottom wall may seal the cavity. Foam may be disposed inside the cavity.

In some optional forms, the lateral spring member extends continuously along the longitudinal axis of the body of the two-stage seal.

In some optional forms, the body is formed of a first material, the lateral spring member is formed of a second material. The second material may be stiffer than the first material.

In some optional forms, the base member of the seal has a first end and a second end and extends laterally across the interface between the flow control member and the fixed surface. The first seal wall may from the base member and forming the dynamic seal. The first wiper seal may extend laterally outwardly from the base member and, preferably, be arranged to form the static seal. The groove may be adjacent the base member and the first seal wall. The spring member may extend laterally from the first end to the second end of the base member. The base member and the spring member preferably urge the wiper seal laterally outwardly toward a static sealing position between the flow control member and the fixed surface in response to an increased pressure inside the groove. The lateral spring member preferably urges the wiper seal laterally inwardly from the static sealing position. The fixed surface may be formed by a cage. The flow control member may include a land. The two-stage seal may be disposed inside the land.

In some optional forms, the valve assembly is a sliding stem valve.

Additional optional aspects, arrangements, and features are disclosed, which may be arranged in any functionally appropriate manner, either alone or in any functionally viable combination, consistent with the teachings of the disclosure. Other aspects and advantages will become apparent upon consideration of the following detailed description.

DETAILED DESCRIPTION

Figure 2:
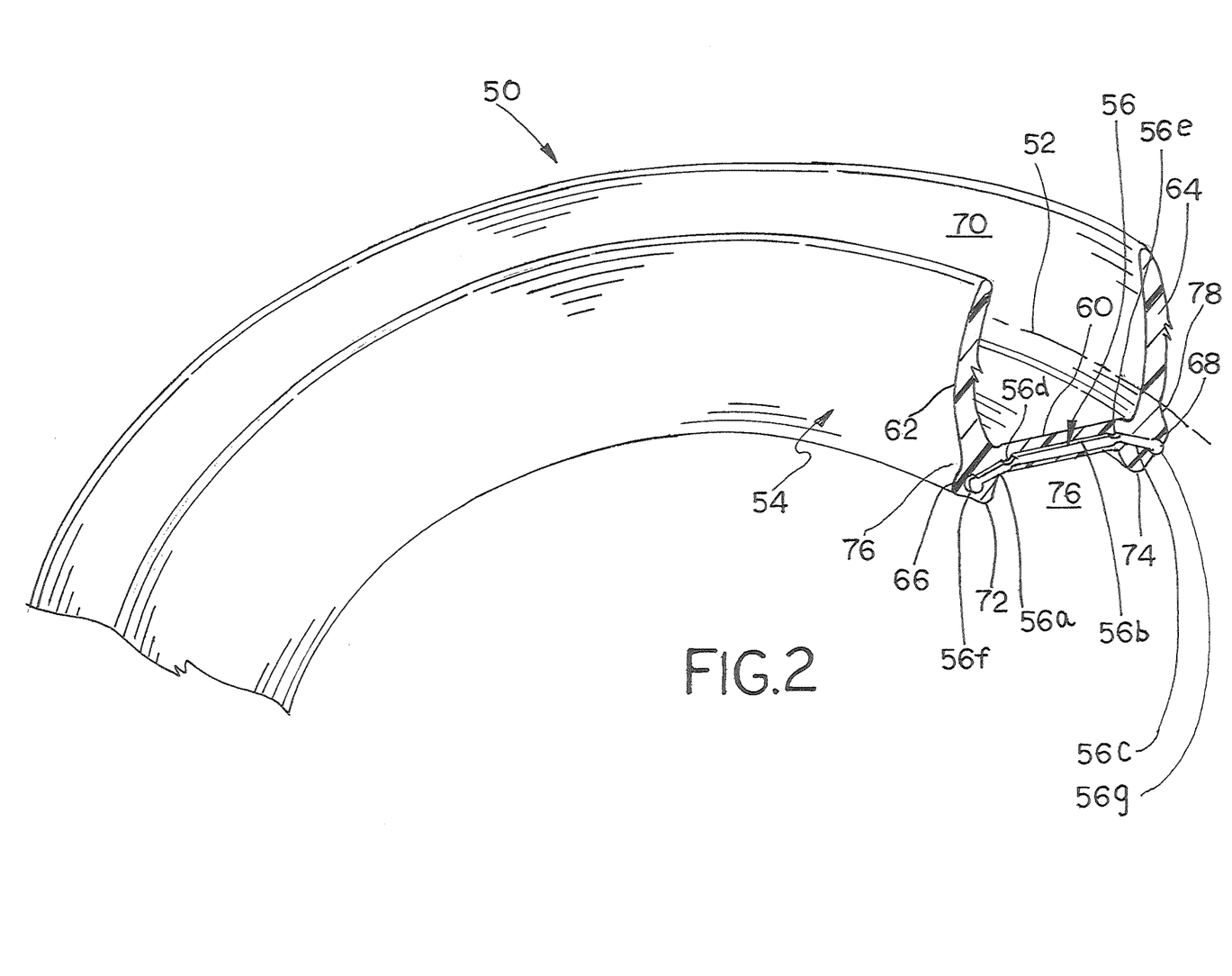
FIG. 2 is an isometric view in partial cutaway of a two-stage seal according to the teachings of the present application.

Turning now to the drawings, FIG. 2 shows a two-stage seal 50 exemplifying certain aspects according to at least some principles of the present disclosure. The seal 50 is arranged to form a dynamic seal as one stage and a releasable static seal as another stage against an adjacent sealing surface that slides such as by reciprocating vertically adjacent to the seal. (All directional modifiers such as "up," "down," "left," "right," etc., are used in reference to the drawings solely for ease of reference and description, are not meant to otherwise limit the disclosure.) The seal 50 has an elongate cross-sectional profile that extends along a longitudinal axis 52. The longitudinal axis may be straight or curved or segmented. In the exemplary arrangement shown in FIG. 2, the seal 50 has a circular longitudinal axis 52 forming a circular ring, whereby the seal 50 forms a ring seal. In other arrangements, the longitudinal axis may be, for example, oval, straight, curvilinear, or polygonal.

The seal has an outer shell or body 54 having one or more dynamic seal members arranged to form the dynamic seal, one or more static seal members arranged to form the static seal, and a lateral spring member 56 for resiliently controlling lateral expansion and/or contraction of the static seal members. The body 54 is made of a flexible sealing material suitable for forming a liquid or gas seal against an adjacent body, such as a valve flow control member, valve body, cage, piston, and/or cylinder wall. The sealing material may, for example, include neoprene, silicon rubber, rubber, and/or plastic. The spring member 56 is made of a spring material that is flexible and resilient and preferably stiffer than the material forming the body. The spring material may, for example, include spring metal, such as steel or stainless steel, other resilient metals and metal alloys, a resilient thermoplastic, or any other material having flexibility and resilience to function as a transverse spring member in accordance with the principles of the present disclosure.

The body has a base member 60, a first seal wall 62 extending from a first lateral end of the base member, a second seal wall 64 extending from a second lateral end of the base member, a first wiper seal 66 disposed along the first lateral end of the base member 60, and a second wiper seal 68 disposed along the second lateral end of the base member. The seal walls 62, 64 form the dynamic seal members, and the wiper seals 64, 66 form the dynamic seal members. The base member 60 extends laterally between the lateral ends, preferably in a transverse plane. Each of the first and second seal walls 62, 66 projects upwardly from a top surface of the base member 60 and together define a groove 70 with an open mouth extending along the longitudinal axis 52. The first and second seal walls 62, 64 are disposed on opposite sides of the groove 68, and the base member 60 extends across a bottom of the groove 68 opposite the mouth. The first and second wiper seals 66, 68 are disposed below the lateral ends of the base member 60, such as by being offset below the lateral ends and/or by having the base member 60 be arched convexly upwardly toward the groove 70, such that increased pressure in the groove 68 pressing downwardly against the base member 60 causes the wiper seals 66, 68 to shift, such as by flexing and rolling, laterally outwardly. Each wiper seal 66, 68 preferably is formed as a rib that projects laterally outwardly from the body 54, and may have a rounded profile or may have an angled distal edge, 69 shown for example in FIG. 3.

The lateral spring member 56 extends laterally across the base member 60 and is arranged to resiliently return the wiper seal 66, 68 laterally inwardly to an un-flexed position. Preferably, the lateral spring member 56 is encased within the base member 60 and the wiper seals 66, 68. The lateral spring member 56 has a first end disposed in or along the first wiper seal 66, a second end disposed in or along the second wiper seal 68, and forms an arch directed convexly upwardly toward the groove 70. Alternatively, the lateral spring member 56 may be secured to an outer surface of the body 54, and/or some portions of the lateral spring member 56 may be encased within the body 54 and other portions of the lateral spring member 56 may be exposed outside of the body 54. The arch may be formed of a plurality of linear segments, such as the segments 56a, 56b, 56c, as shown for example in FIGS. 2-4 and/or by one or more curved segments. Hinges, such as hinges 56d and 56e may be used to join segments of the arch. The first hinge 56d joins the segments 56a and 56b, and the second hinge 56e joins the segments 56b and 56c. In a preferred arrangement, the lateral spring member 56 is a continuous member extending the entire length of the body 54 along the longitudinal axis 52. Where the seal 50 forms a ring seal, the lateral spring member 56 may be a single piece of, for example, stamped spring steal forming a generally planar ring. The hinges 56d and 56e may be formed as living hinges formed into the spring member 56. Alternatively, as shown for example in FIG. 6, the arch of the lateral spring member 56 may be a continuous curved section, such as an arc of a circle or oval, extending from the first wiper seal 66 to the second wiper seal 68 and forming a ridge directed upwardly toward the groove 70. In this arrangement, the lateral spring member 56 has a single arcuate section, and the lateral spring member 56 does not have any hinge sections. However, in other arrangements, hinge sections may be included along the continuous curved section. Optionally, the lateral spring member 56 may include one or more enlarged sections to prevent slippage of the lateral spring member 56 against the body 54, such as beads 56f, 56g disposed along either or both lateral ends of the lateral spring member 56.

Figures 3, 5:
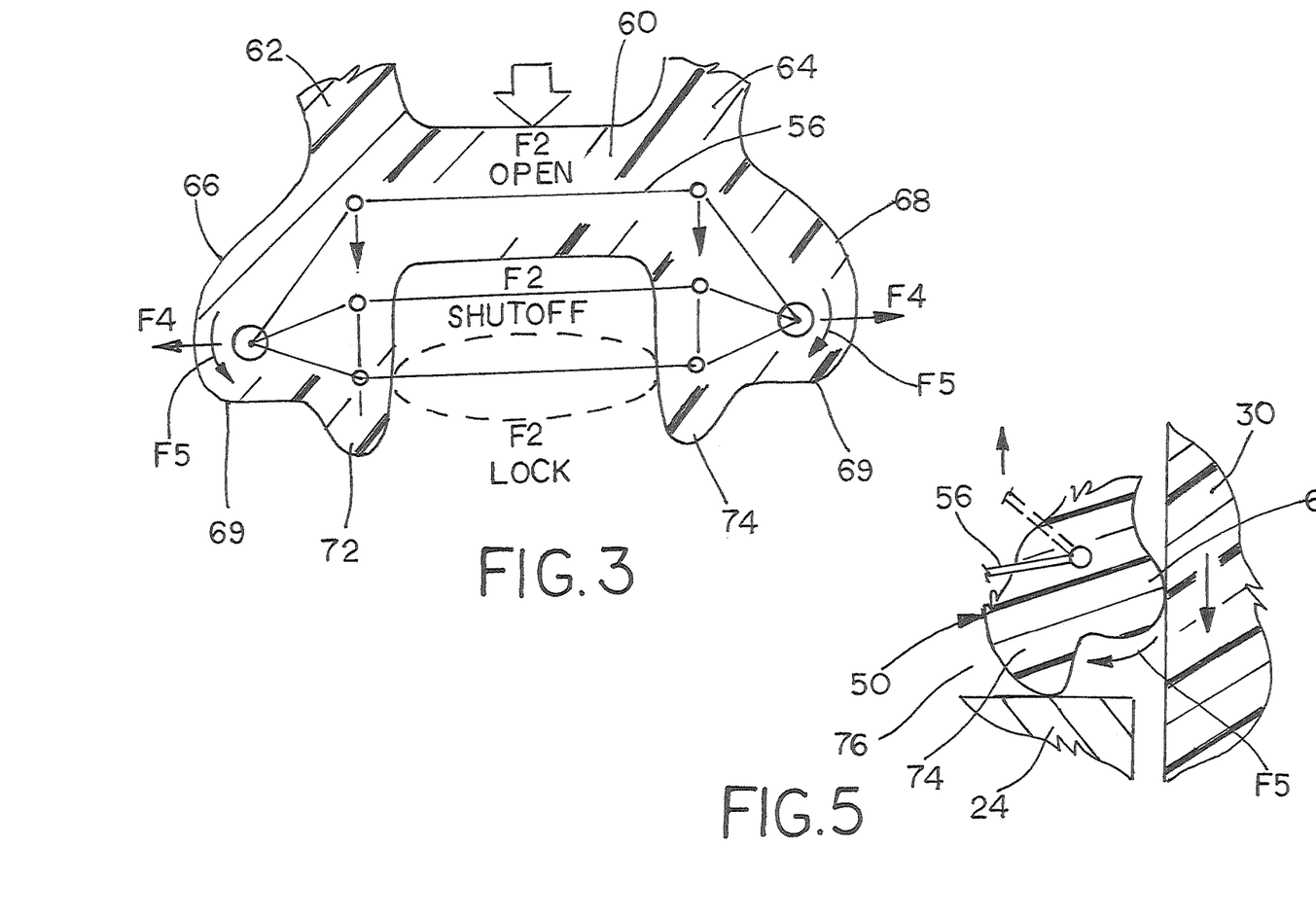
FIG. 3 is a schematic cross-sectional view showing locking action of the seal of FIG. 2.
FIG. 5 is an enlarged cross-sectional detail of the seal of FIG. 2 showing a releasing action of the seal.

As shown schematically in FIG. 3, as fluid pressure F2 pushes the base member 60 downwardly into planar or linear alignment with the wiper seals 66, 68, the wiper seals 66, 68 are displaced laterally outwardly by bowing of the base member 60 and the lateral spring member 56. In an open position, the base member 60 and the lateral spring member 56 are in an un-flexed position with the wiper seals 66, 68 withdrawn laterally inwardly, preferably either laterally aligned (e.g., vertically) with the outermost surface of the respective seal walls 62, 64 or displaced laterally inwardly from the outermost surface of the respective seal walls 62, 64. Increased fluid pressure F2 in the groove 70 pushes the base member 60 and the lateral spring member 56 to bow downwardly away from the groove 70, first to an intermediate or "shutoff" position, and ultimately to a "locked" position. In the intermediate position, the base member 60 and the lateral spring member 56 are flattened, for example with the wiper seals 66, 68, the base member 60, and the lateral spring member 56 aligned, such as generally horizontally or in the transverse plane. In the intermediate position, the wiper seals 66, 68 are displaced a maximum amount laterally outwardly to form a strong static seal. In the locked position, the central portion of the arch of the lateral spring member 56 is bowed downwardly past linear alignment with the ends of the lateral spring member, i.e., in a past-center position, and the lateral spring member 56 locks (at least to some degree) the wiper seals 66 and 68 into a laterally outwardly displaced arrangement by the past-center deformation of the arch. The wiper seals 66, 68 can be "unlocked" to withdraw back laterally inwardly in one arrangement by applying a moment generating force to the bend the lateral spring member 56 and the base member 60 back to the un-flexed, arched position, such as the opposing rotational forces F5 applied to either or both of the wiper seals 66, 68.

Returning to FIG. 2, recesses, such as grooves 76, 78, are optionally disposed between one or both of the seal walls 62, 64 and the respective adjacent wiper seals 66, 68. For example, each of the seal walls 62, 64 may have a convex outer surface, such as formed by a curved wall as shown in the drawing, that forms the grooves 76, 78 adjacent the wiper seals 66, 68. Such recesses may in some arrangements have multiple benefits, including for example, reducing frictional resistance of one or more dynamic seals formed by the seal walls 62, 64 and/or allowing the wiper seals 66, 68 to more easily roll, or rotate and shift outwardly, when the wiper seals 66, 68 shift to the intermediate and/or locked positions.

First and second support rails 72, 74 are optionally disposed along a bottom surface of the base member 60. The support rails 72, 74 preferably define a cavity 76 along the bottom surface of the base member 60 that allows the base member 60 to flex downwardly in response to increased fluid pressure F2 inside of the groove 70. Each of the support rails 72, 74 projects downwardly from the base member 60. The first support rail 72 extends along the first lateral end of the base member 60 and the second support rail 74 extends along the second lateral end of the base member 60. The first support rail 72 is aligned with the first seal wall 62. The second support rail 74 is aligned with the second seal wall 64. Each of the support rails 72, 74 may extend continuously without a break along the length of the base member 60. Alternatively, either or both of the support rails 72, 74 may be discontinuous, such as having one or more breaks or gaps (not shown) along the longitudinal length, for example, which may reduce or prevent any buildup of excess pressure or vacuum within the cavity 76.

The first seal wall 62 is arranged to sealingly engage laterally outwardly (i.e., away from the groove 70) against a first sealing surface disposed adjacent the first end of the base member 60. The second seal wall 64 preferably also is arranged to sealingly engage laterally outwardly against a second sealing surface disposed adjacent the second end of the base member 60. Preferably, the first and second seal walls 62, 64 are arranged to resiliently flex laterally inwardly (i.e., toward the groove 70) in response to pressure from the adjacent sealing surface to form one or more dynamic seals against the adjacent sealing surfaces, such as by being cantilevered from the base member 60 with upper or distal edges disposed on opposite sides of the mouth into the groove 70. The first and second seal walls 62, 64 are also preferably arranged to resiliently flex laterally outwardly in response to increased fluid pressure inside the groove 70. One or both of the first and second seal walls 62, 64 may be arranged to form a single sealing line with the respective adjacent sealing surface that is less than the length of the seal wall, such as by having a curved convex outer surface as shown in the drawings and/or one or more horizontal ribs (not shown) along the outer surface of the seal wall.

Figure 4:
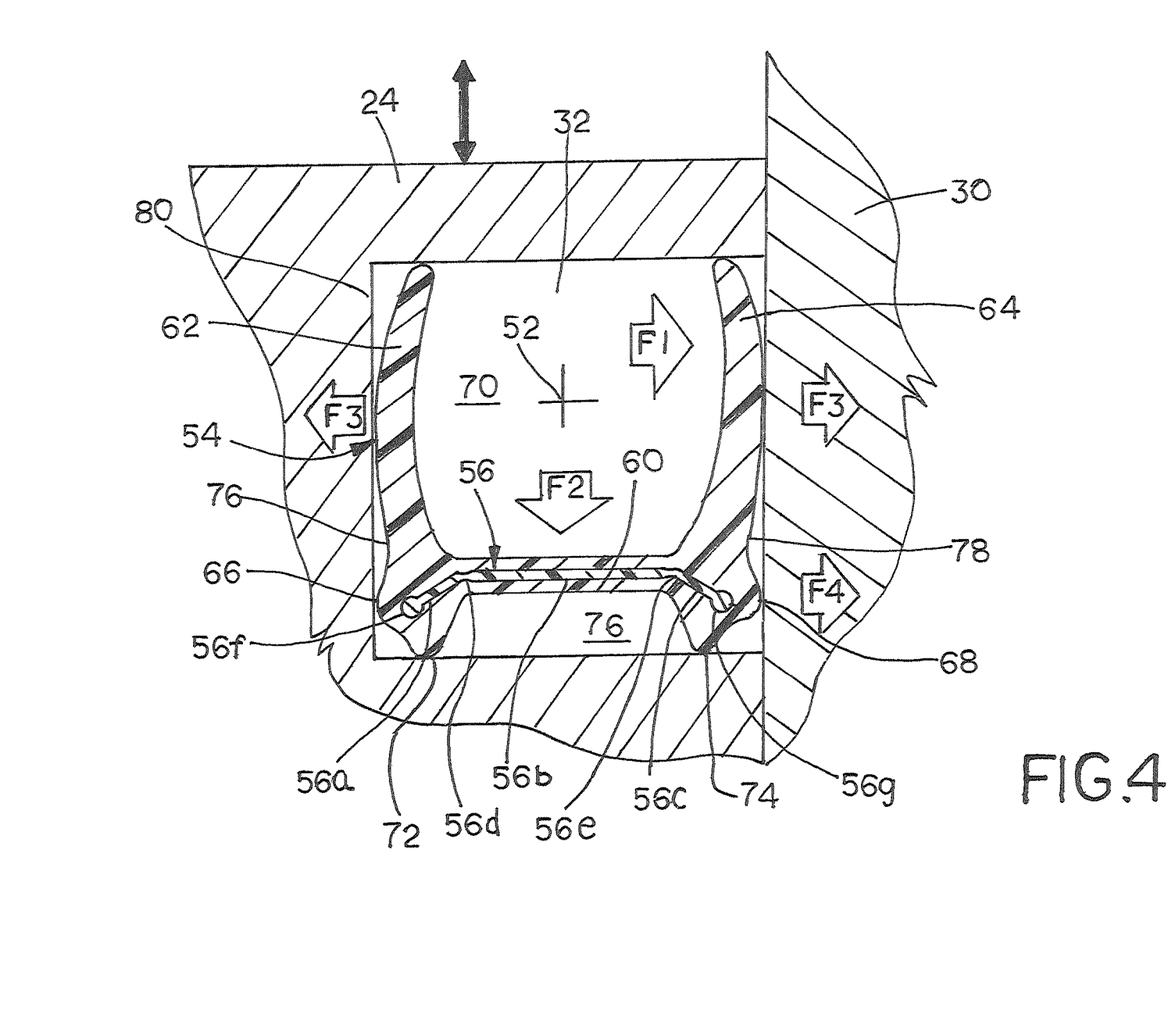
FIG. 4 is a detail cross-sectional view of the seal of FIG. 2 disposed in the land of the sliding stem valve of FIG. 1.

Turning now to FIG. 4, the seal 50 is shown operatively installed in the land 32 of the flow control member 24 of the sliding stem valve 10 of FIG. 1. All portions of the valve 10 (except the seal 12) are substantially the same as shown and described with respect to FIG. 1 and are not repeated here. However, it is understood that the seal 50 may be used in other types of valves or other mechanisms that have an interface requiring a dynamic seal and/or a static seal. Further, the seal 50 may be carried by other pieces of the valve. For example, the seal 50 in other arrangements may be carried in a land disposed in the cage 30, or the seal 50 may be used to form a seal at an interface directly between the flow control member 24 and the body 14 and/or the bonnet 22, and so on. Although the examples shown in the drawings are of sliding stem valves, it is anticipated that in some arrangements the seal 50 may be adapted for use in a rotary valve.

The seal wall 64 forms dynamic seal against the adjacent surface of the cage 30. Preferably, the seal wall 62 also forms a seal against the inner peripheral wall 80 of the land 32. The dynamic seal and the seal with the inner peripheral wall are preferably line seals, such as formed along the laterally outermost portions of the outer convex surfaces of the seal walls 62 and 64; however, in other arrangements, these seals may be formed by ridges along the outer surfaces of the seal walls or the seal walls may have flat surfaces to form a longer sealing interface, or surface seal. The seal wall 64 seals against the cage 30 with a lateral force F3. Preferably the lateral force F3 is sufficient to provide a reasonable fluid seal against the cage 30 without creating undue or excess friction to slow or hamper sliding movement of the cage 30 relative to the flow control member 24.

The first and second wiper seals 66, 68 form one or more releasable static seals against the respective inner peripheral wall 80 and the cage 30 in response to an increase in pressure in the groove 70, such as during shutoff of the valve 10. For example, when a valve in a pressurized fluid line is moved quickly from an open position to the closed position, it is common for a sudden increase in process fluid back pressure, known as a "hammer" or a "flow energy spike" or simply a "pressure spike," to form temporarily in the fluid line on the upstream side of the valve. The magnitude of the pressure spike in the process fluid can depend on many different variables, such as the speed of the valve shut off, the flow rate through the valve, the steady state pressure in the line, and so on, as is well known in the art. In the arrangement shown in FIG. 4, the first and second wiper seals 66, 68 preferably are either spaced away from the adjacent surfaces of the peripheral wall 80 and cage 30 or only lightly engage the adjacent surfaces in the open unflexed position so as to minimize frictional forces therewith during movement of the flow control member 24. However, when a pressure spike in process fluid occurs upstream of the valve, such as when the flow control member 24 is rapidly closed, the pressure spike causes increased fluid pressure forces F2 inside the groove 70 to flex the base member 60 and the lateral spring member 56 downwardly toward the shutoff position and preferably to the locked position as described previously. In the shutoff and locked positions, the wiper seals 66 and 68 engage more forcefully against the adjacent sealing surfaces to create a stronger static seal therewith than is formed by the seal walls 62, 64 alone. Preferably, the wiper seal 68 is arranged to flex laterally outwardly to form a releasable static seal with the adjacent sealing surface of the cage 30 with a static sealing force F4, and the wiper seal 66 is arranged to flex laterally outwardly to form a releasable static seal with the adjacent sealing surface of the inner peripheral wall 80. Thus, the wiper seals 66, 68 provide one, two, or more releasable static seals, preferably only in response to the pressure spike, to prevent leakage that might otherwise overcome the dynamic seals formed by the sealing arms 62, 64. Further, the wiper seals 66, 68 may be locked in the locked position to maintain the stronger static seal until the lateral spring member 56 is urged out of the locked position.

The increased pressure inside the groove 70 from a pressure spike in the process fluid may also increase lateral sealing pressure F1 against the seal wall 64 and/or the seal wall 62 and increase the dynamic seal pressure F3 against the respective adjacent sealing surfaces of the cage 30 and/or the inner peripheral wall 80. Therefore, the first and second seal walls 62, 64 are preferably arranged to flex or bend laterally outwardly from the longitudinal axis 52 in response to an increase in fluid pressure inside the groove 70. However, the seal walls 62 and 64 do not have a locking mechanism to maintain the increased sealing pressure and the dynamic seal pressure F3 may subside after the process fluid pressure spike subsides.

In one arrangement shown diametrically in FIG. 5, the wiper seals 66 and/or 68 may be unlocked by movement of the flow control member 24 back toward an open position. Friction of the cage 30 against the wiper seal 68 generates the moment force F5 on the wiper seal 68 and rotates the lateral spring member 56 and the base 60 in a clockwise motion to return the base 60 and to the un-flexed open position as described previously. In this arrangement, the lateral spring member 56 may be particularly helpful to overcome any suction or vacuum created in the cavity 76, thereby eliminating or substantially reducing any increase in opening force needed to unlock the static seals formed by the wiper seals 66, 68. When the base 60 and the lateral spring member 56 return to the un-flexed open position, the wiper seals 66, 68 withdraw away from or at least substantially decrease static sealing pressure F4 against the adjacent sealing surfaces, thereby releasing the static seals and again minimize frictional resistance to motion of the flow control member 24 during opening movement of the valve 10.

Figure 6:
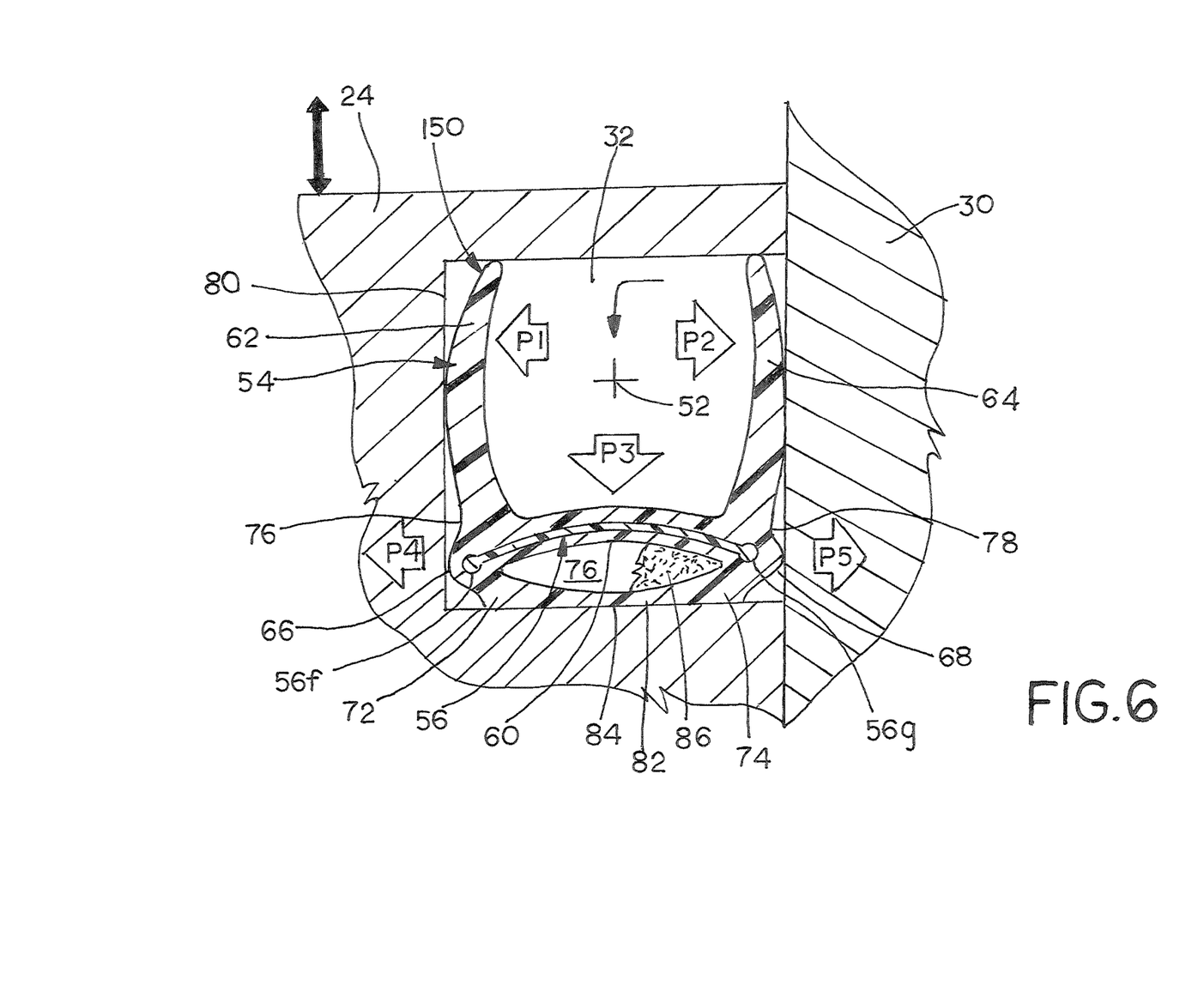
FIG. 6 is a detail cross-sectional view of a two-stage seal according another aspect of the present application disposed in the land of the sliding stem valve of FIG. 1.

Turning now to FIG. 6, another two-stage seal 150 according to one or more principles of the present application is shown. The seal 150 is generally similar to the seal 50, with the exceptions detailed hereinafter, and the seal 150 is shown in an operative position in the valve 10 similar to the position shown in FIG. 4. Corresponding structures on the seal 150 are given the same reference number as the seal 50, and such structures are not described again in detail, but rather the reader is referred to the previous description.

Unlike the seal 50, the cavity 76 of the seal 150 is enclosed. The body 54 has a bottom wall 82 that spans laterally from the support rail 72 to the support rail 74 and encloses the cavity 76. Preferably, the base member 60, the bottom wall 82, and the support rails 72 and 74 surround and seal the cavity 76. The bottom wall 82 may have a flat bottom surface 84 for engagement with a bottom wall of the land 32. In a ring seal arrangement, the bottom wall 82, the base member 60, and the support members 72 and 74 may be continuous along the entire length of the longitudinal axis 52. In other arrangements, the cavity 76 may not be sealed, for example, by having one or more openings (not shown) extending through the body 54 into the cavity 76. The cavity 76 may be partly or completely filled with a filler 86, such as a foam, or be substantially empty. In use, the seal 150 functions substantially as described previously. The addition of the bottom wall 82 in some arrangements may prevent or reduce formation of a vacuum in the cavity 76, which could otherwise hinder or slow the release of the releasable static seals formed by the wiper seals 66 and 68.

Although each of the seals 50 and 150 has a substantially symmetric profile about a vertical centerline through the longitudinal axis 52, the seals do not have to be symmetric. In other arrangements, a seal according to the principles of the present application may form a dynamic seal with only one of the seal walls 62 or 64 and/or may form a releasable static seal with only one of the wiper seals 66 or 68. For example, the only the seal wall 64 and the wiper seal 68 may be formed along the right side of the body 54 for engagement against a sliding sealing surface, such as the cage wall or the valve plug, and the left side of the body may form a simple wall, such as with a flat laterally outer surface, for engagement against a static sealing surface, such as the inner surface of a receiving groove.

The seals 50, 150 shown and described herein in some arrangements function to provide a dynamic seal with minimal frictional losses while opposing surfaces are sliding or shift past each other, such as when the flow control member 24 is opening or closing within the valve 10. The seals 50, 150 in some arrangements also provides a locking static seal with increased sealing pressure when the opposing surfaces are static, such as when the flow control member 24 has closed to stop process fluid flow and/or opened the valve 10 to allow process fluid flow. Advantageously, the releasable static seal does not engage or engages with less force while the opposing surfaces are moving relative to each other, thereby minimizing potentially undesirable frictional losses, but engages or engages with greater force in response to a process flow pressure spike to prevent the pressure spike from breaching the seal when the opposing surfaces are not moving relative to each other. In some preferred arrangements, the dynamic seal and the static seal functionalities act independently of each other and are combined into a single seal, such as the seals 50 or 150. Thus, the seals 50 or 150 may provide an improved alternative to previously known two-stage process sealing arrangements. The seals 50 or 150 may provide for improved static sealing pressure without adding significant friction to the dynamic sealing pressure.

Each of the optional arrangements described herein may be arranged in any set of combinations or permutations sufficient to provide any combination of one or more functionalities suggested by the description provided herein. Further, it is understood that each of the features disclosed with respect to each exemplary arrangement may be combined in any functional combination, such as to provide any useful combination of functionalities as would be understood by a person of ordinary skill.

A two-stage seal and a valve including a two-stage seal incorporating any one or more of the various aspects, arrangements, and/or options disclosed herein is useful in many different process control applications, some examples of which include an industrial piping arrangement, such as in petro-chemical refineries, chemical process piping and chemical plants, water piping, steam piping, etc. The seal and valve described herein, however, are not limited to any particular industrial usage and may be used in any manner or application as desired.

Numerous modifications to the seals and/or the valve disclosed herein will be apparent to those skilled in the art in view of the foregoing description. Accordingly, this description is to be construed as illustrative only and is presented for the purpose of enabling those skilled in the art to make and use the invention and to teach the preferred mode of carrying out same. The exclusive rights to all modifications within the scope of the disclosure and the appended claims are reserved.

What is claimed:

1. A two-stage seal for forming a static lateral seal and a dynamic lateral seal along a sliding interface between a first sealing surface and a second sealing surface in a pressurized process line, the seal comprising:
    a body defining a dynamic seal member and a static seal member, wherein each of the dynamic seal member and the static seal member is arranged to sealingly engage the first sealing surface, the first surface arranged to shift in relation to the body, wherein the body has a profile comprising a base member, wherein the dynamic seal member extends from the base member in a first direction, and wherein the static seal member extends laterally from the base member in a second direction; and
    a spring member carried by the body, wherein the spring member is encased within the base member;
    wherein the dynamic seal member is arranged to form a dynamic seal with the first sealing surface;
    wherein the static seal member is arranged to form a static seal with the first sealing surface in response to an increased pressure in the pressurized process line and is arranged to release the static seal; and
    wherein the dynamic seal member functions substantially independently of the static seal member.

2. The two-stage seal of claim 1, wherein the profile of the body further comprises:
    a first seal wall extending from the base member in the first direction, the first seal wall defining the dynamic seal member;
    a groove adjacent the base member and adjacent the first seal wall; and
    a wiper seal extending laterally from the base member in the second direction, the wiper seal defining the static seal member;
    wherein increased fluid pressure in the groove causes the wiper seal to shift laterally in the second direction.

3. The two-stage seal of claim 2, wherein the base member bows away outwardly from the groove and shifts the wiper seal laterally in the second direction in response to the increased pressure.

4. The two-stage seal of claim 2, wherein the spring member is carried by the base member and is arranged to urge the wiper seal laterally in a third direction opposite the second direction.

5. The two-stage seal of claim 2, wherein the spring member forms an arch laterally across the base member, the arch being convex toward the groove.

6. The two-stage seal of claim 1, wherein the seal comprises a ring seal.

7. A two-stage seal having a profile extending along a longitudinal axis, the profile comprising:
  a body defining a base member extending laterally from a first end to a second end, a first seal wall extending upwardly from the first end of the base member, a second seal wall extending upwardly from the second end of the base member, a first wiper seal extending laterally outwardly from the first end of the base member, wherein the base member and the first and second seal walls define a groove opposite the first wiper seal; and
  a lateral spring member carried by the base member, the lateral spring member having a second profile extending from the first end to the second end of the base member;
  wherein the base member and the lateral spring member urge the wiper seal laterally outwardly toward a static sealing position in response to an increased pressure inside the groove, and wherein the lateral spring member urges the wiper seal laterally inwardly from the static sealing position.

8. The two-stage seal of claim 7, wherein the wiper seal is offset downwardly from the base member.

9. The two-stage seal of claim 7, wherein the lateral spring member has an arched profile with a convex side directed upwardly toward the groove.

10. The two-stage seal of claim 7, wherein the lateral spring member comprises a hinge portion along the profile.

11. The two-stage seal of claim 7, wherein the body further comprises:
  a first support rail projecting downwardly from the base member; and
  a second support rail projecting downwardly from the base member;
  wherein the base member and the first and second support rails define a cavity.

12. The two-stage seal of claim 11, wherein the body further comprises:
  a bottom wall enclosing the cavity.

13. The two-stage seal of claim 12, further comprising: foam disposed inside the cavity.

14. The two-stage seal of claim 12, wherein the bottom wall extends from the first support rail to the second support rail and seals the cavity.

15. The two-stage seal of claim 7, wherein the lateral spring member extends continuously along the longitudinal axis.

16. The two-stage seal of claim 7, wherein the body forms a ring seal, and wherein the body comprises a first material, the lateral spring member comprises a second material, and the second material is stiffer than the first material.

17. A valve assembly for a pressurized process flow line, the valve comprising:
  a valve body defining a flow passage extending from an inlet to an outlet;
  a flow control member disposed in the flow passage, wherein the flow control member is arranged to shift in relation to a fixed surface along the flow passage to open and close the flow passage; and
  a two-stage seal having a seal body and a spring member encased within the seal body, wherein the seal body is arranged to form a dynamic seal and a static seal across an interface between the flow control member and the fixed surface, wherein the seal body is arranged to engage the static seal in response to a pressure spike in the flow passage, and wherein the spring member is arranged to disengage the static seal.

18. The valve assembly of claim 17, wherein the seal body comprises:
  a base member having a first end and a second end, the base member extending laterally across the interface between the flow control member and the fixed surface;
  a first seal wall extending from the base member and forming the dynamic seal;
  a first wiper seal extending laterally outwardly from the base member and arranged to form the static seal; and
  a groove adjacent the base member and the first seal wall;
  wherein the spring member is carried by the base member, the spring member extending laterally from the first end to the second end of the base member, and
  wherein the base member and the spring member urge the wiper seal laterally outwardly toward a static sealing position between the flow control member and the fixed surface in response to an increased pressure inside the groove, and wherein the lateral spring member urges the wiper seal laterally inwardly from the static sealing position.

19. The valve assembly of claim 18, wherein the fixed surface comprises a cage, wherein the flow control member comprises a land, and wherein the two-stage seal is disposed inside the land.

20. The valve assembly of claim 17, wherein the valve assembly comprises a sliding stem valve.

* * * * *

UNITED STATES PATENT AND TRADEMARK OFFICE
CERTIFICATE OF CORRECTION

PATENT NO. : 9,644,742 B2
APPLICATION NO. : 14/185821
DATED : May 9, 2017
INVENTOR(S) : Mark J. Linser It is certified that error appears in the above-identified patent and that said Letters Patent is hereby corrected as shown below:

In the Specification

At Column 2, Line 5, "cage 32." should be -- cage 30. --.

At Column 3, Line 21, "seal;" should be -- seal. --.

At Column 4, Line 28, "according" should be -- according to --.

At Column 5, Line 8, "wiper seals 64, 66" should be -- wiper seals 66, 68 --.

At Column 5, Line 11, "seal walls 62, 66" should be -- seal walls 62, 64 --.

At Column 5, Line 15, "groove 68," should be -- groove 70, --.

At Column 5, Line 16, "groove 68" should be -- groove 70 --.

At Column 5, Line 21, "groove 68" should be -- groove 70 --.

Signed and Sealed this
Thirtieth Day of January, 2018

Joseph Matal
*Performing the Functions and Duties of the
Under Secretary of Commerce for Intellectual Property and
Director of the United States Patent and Trademark Office*